US006684897B2

(12) United States Patent
Sundararajan

(10) Patent No.: US 6,684,897 B2
(45) Date of Patent: Feb. 3, 2004

(54) VALVE ACTUATOR AND METHOD

(75) Inventor: Alagarsamy Sundararajan, Houston, TX (US)

(73) Assignee: Worldwide Oilfield Machine, Inc., Houston, TX (US)

( * ) Notice: Subject to any disclaimer, the term of this patent is extended or adjusted under 35 U.S.C. 154(b) by 0 days.

(21) Appl. No.: 10/308,806

(22) Filed: Dec. 3, 2002

(65) Prior Publication Data

US 2003/0116200 A1 Jun. 26, 2003

Related U.S. Application Data

(62) Division of application No. 09/802,209, filed on Mar. 8, 2001, now Pat. No. 6,609,533.

(51) Int. Cl.$^7$ .......................... F16K 37/00; F16K 30/12
(52) U.S. Cl. ...................... 137/15.19; 251/14; 251/63; 251/291; 137/556
(58) Field of Search .................... 251/62, 63, 214, 251/14, 291; 137/15.19, 556

(56) References Cited

U.S. PATENT DOCUMENTS

| | | | |
|---|---|---|---|
| 2,991,042 A | 7/1961 | Natho | |
| 3,378,224 A | 4/1968 | Boyle | |
| 3,379,405 A | 4/1968 | Natho | |
| 3,466,001 A | 9/1969 | Nelson | |
| 3,572,032 A | 3/1971 | Terry | |
| 3,624,802 A | * 11/1971 | Ripert | ............... 251/31 |
| 3,765,642 A | 10/1973 | Nelson | |
| 3,842,854 A | 10/1974 | Wicke | |
| 3,913,883 A | 10/1975 | Irwin | |
| RE29,322 E | * 7/1977 | Nelson | ............... 251/14 |
| 4,129,283 A | * 12/1978 | Taylor | ............... 251/62 |
| 4,212,355 A | 7/1980 | Reardon | |
| 4,213,480 A | 7/1980 | Orum et al. | |
| 4,230,299 A | 10/1980 | Pierce, Jr. | |
| 4,240,455 A | 12/1980 | McGee | |
| 4,340,204 A | * 7/1982 | Herd | ............... 251/327 |
| 4,423,748 A | 1/1984 | Ellett | |
| 4,436,279 A | 3/1984 | Bonds et al. | |
| 4,445,424 A | 5/1984 | Foster et al. | |
| 4,619,434 A | 10/1986 | Snyder et al. | |

(List continued on next page.)

Primary Examiner—A. Michael Chambers
(74) Attorney, Agent, or Firm—Kenneth L. Nash

(57) ABSTRACT

A subsea actuator and method is disclosed that includes all moving components mounted in a compact, concentric configuration. The subsea actuator is highly reliable and will operate at depth even with zero valve body cavity pressure. A preferably cup-shaped spring pusher is provided in telescoping relationship to the hydraulic chamber. A piston position indicator is provided which is connected externally to the hydraulic piston cylinder to avoid the possibility of hydraulic leaks due to the piston indicator. A manual override may be provided with a manual override indicator. The manual override indicator has a shorter travel length than the manual override operating stem to thereby reduce the overall length of the manual override assembly. The driving stem provides a removable connection to the hydraulic piston from the top of the actuator housing and a quick disconnect permits disconnection of the driving stem from the valve stem. In a preferred embodiment, upper and lower t-slot connections are utilized in the driving stem assembly. In a preferred embodiment, two back seat valves are removably secured to the driving stem to engage respective seats and provide additional sealing around the driving stem so as to prevent leakage between the valve chamber and actuator housing chamber. The high tension spring does not need to be removed to perform maintenance, and all wear items and seals are readily accessible. Change or replacement of the stem packing is made from the top of the bonnet to avoid dissasembling the bonnet to valve body connection. Pre-load bolts are used to adjustably preload the tension in the return spring. The height/weight of the actuator is significantly reduced as compared to prior art subsea valve actuators.

35 Claims, 6 Drawing Sheets

U.S. PATENT DOCUMENTS

| | | |
|---|---|---|
| 4,649,704 A | 3/1987 | Marsh |
| 4,650,151 A | 3/1987 | McIntyre |
| 4,744,386 A * | 5/1988 | Frazer .................. 137/315 |
| 4,809,733 A | 3/1989 | Hawkins |
| 4,827,963 A | 5/1989 | Baker et al. |
| 4,836,243 A | 6/1989 | Ferrell |
| 4,967,785 A | 11/1990 | Young |
| 5,501,424 A | 3/1996 | Williams et al. |
| 5,803,431 A | 9/1998 | Hoang et al. |
| 5,894,771 A | 4/1999 | Braun et al. |
| 6,041,804 A | 3/2000 | Chatufale |

* cited by examiner

VALVE ACTUATOR AND METHOD

This is a divisional application of U.S. patent application Ser. No. 09/802,209, filed Mar. 8, 2001 now U.S. Pat. No. 6,609,533, issued Aug. 26, 2003.

BACKGROUND OF THE INVENTION

1. Field of the Invention

The present invention relates generally to gate valve actuators and, in a particular embodiment, to apparatus and methods for a fail-safe hydraulic subsea actuator that reliably operates in deep water for extended time periods.

2. Description of the Background

Remote subsea fail-safe gate valves are typically controlled with hydraulic actuators. The hydraulic actuators and often their controls are located on the ocean floor along with other equipment. Due to the cost of positioning equipment on the ocean floor, it is desirable that any equipment be as compact as possible while still affording very high reliability. Although the location, configuration and types of actuators and controls vary, their operation is subjected to ambient sea pressure whether the actuator and controls are an open or closed system. The time required for a fail-safe valve to fail-safe close is critical, and therefore a short response time is highly desirable. The more hydraulic fluid required to operate the actuator, the longer the operation time. As water depth increases, increased hydrostatic head, or ambient sea pressure, creates forces on the valves and actuators that due to a combination of conditions can unreasonably delay or preclude fail-safe operation upon loss of hydraulic control pressure. The valve size and internal valve line pressure can create additional problems under such conditions. As well, the hydraulic fluid volume and pressure may be limited due to the need to avoid multiple hydraulic lines to the surface. Moreover, it is sometimes desirable to change out hydraulic fluid to prevent contamination that might cause actuator failure. This is another reason for limiting the amount of hydraulic fluid necessary for controlling the actuator because use of a smaller volume of fluid is quicker to exchange and/or clean. Moreover, it would be desirable to avoid hydraulic fluid contact with return springs that are used in the subsea actuators because contaminants often eventually get into the hydraulic fluid and react with the return springs thereby further increasing hydraulic fluid contamination and/or damaging the return spring.

As another matter, it would be desirable to improve indicators which can be viewed by remotely operated vehicles. In some cases, such indicators require seals that may fail and cause actuator failure. Indicators may also increase the size of the actuator.

U.S. Pat. No. 6,041,804, issued Mar. 28, 2000, to V. R. Chatufale, discloses a subsea actuator and method that includes a removable monolithic cap/hydraulic chamber that seals the actuator housing top with seals placed around the monolithic cap, defines a straight hydraulic line and port for control line hydraulic fluid, and provides for fasteners to secure the top of the subsea actuator. The monolithic cap/hydraulic chamber is so limited in metal and machine time that it can be a throw away maintenance item. A preferably cup-shaped spring pusher is provided in telescoping relationship to the hydraulic chamber. Several short hydraulic fluid passageways are provided in the bottom cup portion of the spring pusher to permit assist hydraulic control fluid into the hydraulic chamber below the piston. The driving stem provides a removable connection to the hydraulic piston from the top of the actuator housing and a quick disconnect permits disconnection of the driving stem from the valve stem. The high tension spring does not need to be removed to perform maintenance, and all wear items and seals are readily accessible. Change or replacement of the stem packing is made from the top of the bonnet to avoid dissasembling the bonnet to valve body connection. The spring chamber within the actuator housing may be increased in size to accommodate a larger spring as necessary for fail-safe operation without changing the size of the hydraulic chamber. All sliding components ride on wear rings to increase the lifetime of reliable subsea operation. The moving components are mounted in a compact, concentric configuration.

While the above actuator has many advantages, the actuator uses a significant amount of hydraulic fluid which, as explained above can sometimes be problematic. Contact of the spring with hydraulic fluid can also present a long term viability problem. It would also be desirable to limit any leakage that might occur between the valve bonnet and actuator, even if packing should leak. Moreover, the above patent does not address limiting the size of the actuator with respect to manual override operators and valve status indicators.

Furthermore, subsea actuators need to be very reliable because they operate in an environment that is not readily accessible. Conventional subsea actuators often have numerous problems that limit the operational range, reliability, cost, and maintenance thereof. While there are several commercially available subsea actuators on the market with different designs, the problems tend to be related. For instance, over long periods of time packing may leak permitting flow of fluid between the actuator housing and valve bonnet. It would be desirable to eliminate such leakage. Moreover, it would be desirable to provide that any component maintenance used to limit such leakage do not require an expensive complete exchange of the bonnet or valve stem.

In another commonly used design, the spring used for fail-safe operation is located within the hydraulic cylinder. This design is likely to cause hydraulic fluid contamination and spring damage. Moreover, while this arrangement may afford sufficient spring strength for actuation to depths of 1000 feet or so, it results in numerous problems for deep water subsea actuators. In this design, the spring outer diameter is limited to the size of the hydraulic cylinder. It is generally not desirable to increase the size of the hydraulic cylinder to provide a more powerful spring because this also increases the amount of hydraulic fluid necessary for operation and may present a potential problem at significant water depths. With a limited spring size, the fail-safe operation that the spring may afford is limited because the spring size is quite limited. Furthermore, positioning of the spring within the hydraulic cylinder also has the disadvantage of increasing the likelihood of ruining the sealing surfaces of the hydraulic cylinder due to contact with the spring during operation and also during assembly or disassembly. The damage requires replacement or reworking of the entire actuator housing and is therefore quite expensive. In this design, maintenance of even a single seal necessarily requires removal of the spring, which is normally under very high spring pressure, and may be a somewhat dangerous operation without special equipment. Typically, the entire gate valve as well as the operator must be broken down when doing virtually any maintenance. Thus, even replacing a single seal is a time consuming, costly operation. Not only is extensive time required for maintenance, but parts including additional replacement seals of all stationary metal-tometal seals are necessary even though such may have been operating fine without problem. Thus, commonly available actuators tend to have numerous limitations including highly limited operational abilities, reliability problems, and very high maintenance costs.

Consequently, there remains a need for a compact subsea valve actuator that offers dependable operation at significant water depths, reduces the size of the manual override control, reduces the need for hydraulic fluid, reduces maintenance time, provides an improved valve/actuator status indicator system, limits leakage from the actuator to valve even if the packing should leak, permits easier maintenance, all for reduced levels of capital investment. Those skilled in the art have long sought and will appreciate the present invention which provides solutions to these and other problems.

SUMMARY OF THE INVENTION

The present invention is embodied in a design for a hydraulic subsea actuator and method for a gate valve that allows more reliable and improved operation with reduced maintenance costs for any practical water depth, e.g., 10,000 feet. The subsea valve actuator comprises elements, such as for instance, a hydraulic actuator housing, and a hydraulic piston sidably mountable within the hydraulic housing responsively to hydraulic pressure or visa-versa depending on the requirement. The hydraulic piston may be moveable to a first position for closing the valve and to a second position for opening the valve. Other elements may include, if desired, a piston indicator for indicating whether the hydraulic piston is in the first position or the second position, an override member for overriding the hydraulic pressure to control the position of the hydraulic piston manually, and an override indicator for indicating a position of the override member.

In one embodiment of the subsea valve actuator, the piston indicator and the override indicator are visual indicators although the indicators could also or alternatively be electronic, fiber optic, or other types as desired. In another embodiment, the hydraulic piston may be moveable within a hydraulic cylinder between the first position and the second position and the piston indicator may be mounted to the hydraulic actuator housing externally with respect to the hydraulic cylinder. For instance, a moveable member such as a spring pusher may be mounted within the actuator housing externally with respect to the hydraulic cylinder. The moveable member may be operably connected with the hydraulic piston and the piston indicator may be operably connected to the moveable member. The moveable member may be mounted in surrounding relationship with respect to the hydraulic cylinder. The piston indicator further comprises a shaft that engages the moveable member.

In one embodiment, an override drive shaft is moveable a first distance between an override engaged position and an override disengaged position. The override indicator may be moveable a second distance between an override engaged indication position and an override disengaged indication position. Morever, the first distance may be greater than the second distance. One preferred means for forming this embodiment may include, for instance, a first threaded portion of the override drive shaft and a second threaded portion of the override drive shaft such that the first threaded portion and the second threaded portion having different types of threads. In one embodiment, a threaded connection is found between the override drive shaft first threaded portion and the override indicator.

In another embodiment, a cylinder member defines therein the piston chamber in which the hydraulic piston may be mounted for movement. The cylinder member defines a first hydraulic fluid port into the piston chamber on a first side of the piston and a second hydraulic fluid port into the piston chamber on a second side of the piston. A plurality of seals limit movement of hydraulic fluid within the hydraulic actuator housing to the piston chamber, the first hydraulic fluid port, and the second hydraulic fluid port. A manual override assembly may be provided for manually operating the hydraulic piston. A return spring may be provided within the hydraulic actuator housing in surrounding relationship to the cylinder member such that the spring is isolated from the hydraulic fluid by the plurality of seals.

An accumulator may be connected to at least one of the first hydraulic fluid port or the second hydraulic fluid port to provide hydraulic assist to the return spring for moving the hydraulic piston to at least one of the first position or the second position.

In one presently preferred embodiment, the first hydraulic port and the second hydraulic port have an inner diameter of at least three-eighth inches to permit an increased flow of hydraulic fluid as compared to prior art devices along with a corresponding increase in actuator wall thickness.

In one embodiment, a first t-slot connection is used with the actuator shaft for interconnection with the hydraulic piston and a second t-slot connection is used with the actuator shaft for interconnection with the valve.

A packing body member may be provided in surrounding relationship to the actuator shaft or any portion of the actuator shaft assembly, a packing body seal positioned around the packing body member, a packing gland placed adjacently the packing member, and a first relief valve positioned between the packing gland and the packing body seal. A second relief valve may also be provided on an opposite side of the packing gland from the first relief valve.

In one presently preferred embodiment, a first valve member may be mounted to the actuator shaft for movement with the actuator shaft. A first seat is affixed with respect to the actuator housing in surrounding relationship to the actuator shaft. The first valve member engages the first seat for sealing around the shaft such as when the hydraulic piston is in the first position. Moreover, a second valve member may be provided in surrounding relationship to the actuator shaft with the second seat in surrounding relationship to the actuator shaft such that the second valve member seals with the second seat when the hydraulic piston is in the second position. In one embodiment, a first replaceable bushing is provided for the first seat and is used for sealing engagement with the first valve member. As well, the first valve member is replaceably mounted to the actuator shaft. For instance the first valve member may be threadably attached thereto.

In a method of the invention, steps may comprise an aspect of the invention such as for instance, providing a piston indicator for indicating a position of an actuator piston and providing an override indicator for indicating a position of a manual override assembly. The method may include providing that the piston indicator and the override indicator are detectable by a sensor of an undersea remotely operated vehicle and/or providing that the piston indicator is a shaft that does not engage the actuator piston. Moreover, the method may include providing that the override indicator has a shorter travel length than a travel length of an override member that engages the actuator piston.

The method may comprise steps such as mounting a first valve to the actuator shaft for movement therewith, providing a first seat in surrounding relationship to the actuator stem, and engaging the first valve with the first seat when the actuator shafts moves to a first position. Furthermore, the method may comprise steps such as mounting a second valve to the actuator shaft for movement therewith, providing a second seat in surrounding relationship to the actuator stem, and engaging the second valve with the second seat when the actuator shafts moves to a second position.

In one embodiment, leakage between the actuator housing and valve cavity is prevented by mounting a packing body in surrounding relationship to the actuator shaft, providing a recess in a metallic housing for receiving the packing body, mounting a packing body seal between the recess and the packing body, mounting one or more seals around the actuator shaft between the packing body seal and the gate valve for sealing leakage along the actuator shaft, and providing one or more relief valves in communication with the recess. In addition to this, leakage may be prevented by mounting a first valve member to the actuator shaft for movement with the actuator shaft and providing a seat in the packing body such that the first valve engages the seat when the actuator shaft moves to a first position.

It is an object of the present invention to provide an improved subsea hydraulic actuator and method.

It is another object of the present invention to provide a subsea actuator with a convenient configuration that can be readily modified to provide a low profile with substantial spring strength arranged so that the spring cannot damage hydraulic surfaces during manufacture, assembly, or operation.

It is yet another object of the present invention to provide a subsea hydraulic actuator with improved indicators for indicating status of the actuator and/or valve.

An advantage of the present invention is greatly reduced maintenance time and cost.

Another advantage of the present invention is the significant size (height and weight) reduction achieved by a design in accord with the invention.

Another advantage of the present invention is high performance and high reliability.

Yet another advantage of a preferred embodiment of the present invention is an absence of contact of hydraulic fluid with the return spring to avoid damage to the spring.

Yet another advantage of a preferred embodiment of the present invention is reduced contamination of the hydraulic fluid and reduced amount of hydraulic fluid required for hydraulic system cleaning purposes.

Yet another advantage of the present invention is that maintenance tends to require the exchange of less expensive components that protect elements such as the actuator/valve stem, valve bonnet and the like.

These and other objects, features, and advantages of the present invention will become apparent from the drawings, the descriptions given herein, and the appended claims.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

BRIEF DESCRIPTION OF THE PREFERRED EMBODIMENTS

Figure 1:
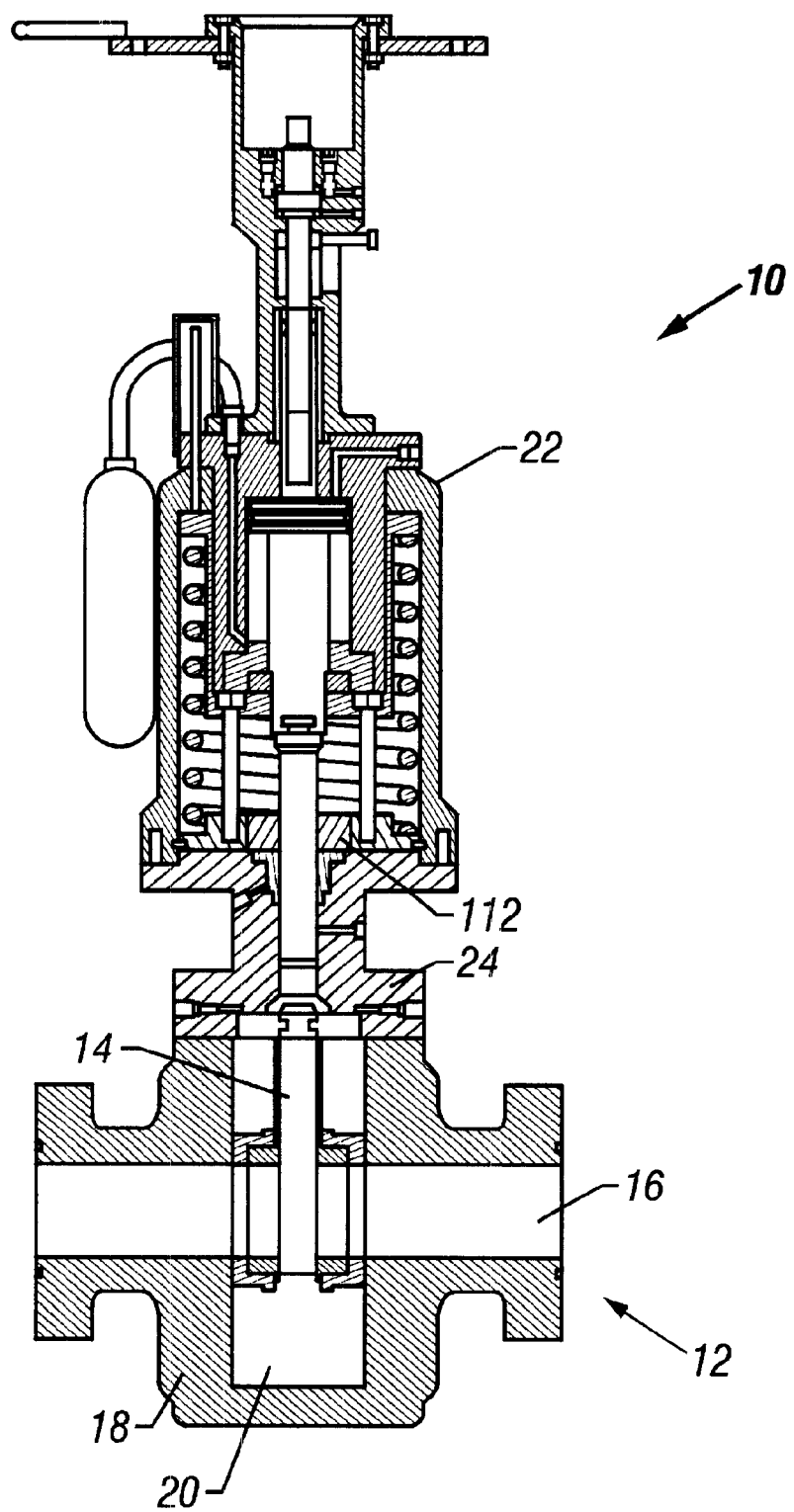
FIG. 1 is an elevational view, partially in section, of a subsea hydraulic actuator assembly mounted to an exemplary valve in accord with the present invention.

Referring now to the drawings, and more particularly to FIG. 1, the generally preferred configuration of subsea actuator 10, in accord with the present invention, is illustrated connected to gate valve 12. Various types of gate valves, such as gate valve 12 may be controlled using the actuator of the present invention. Gate valve 12 includes a gate 14 that may be moved between an open position and a closed position as is well known to control fluid flow through passageway or line 16. Gate valve 12 includes gate valve housing 18. Gate valve chamber 20 may be at line pressure sometimes during operation and one object of the present invention is to provide means for preventing leakage between gate valve chamber 20 and actuator housing 22 as is discussed hereinbelow in detail.

Figure 2:
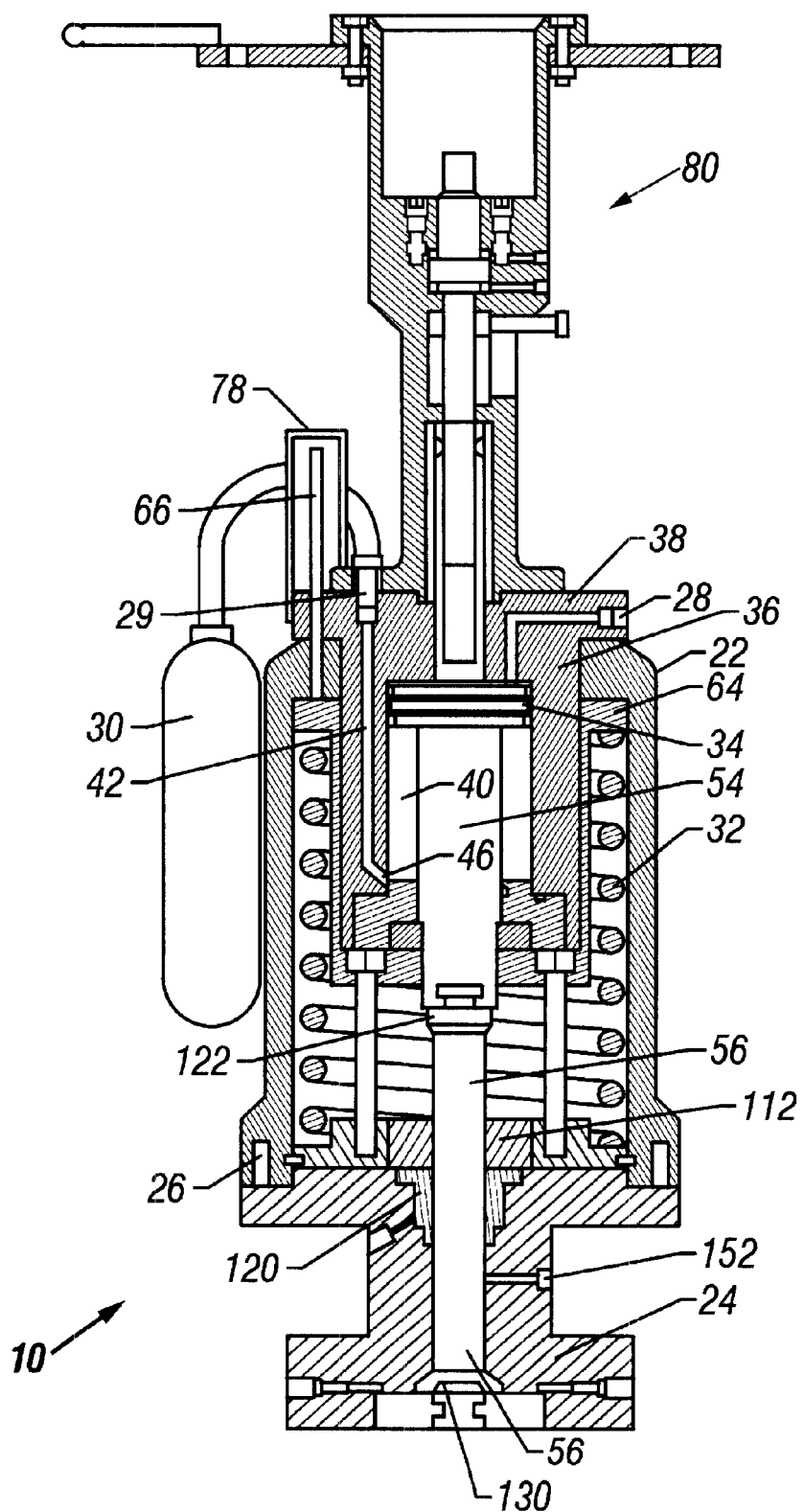
FIG. 2 is an elevational view, partially in section, of a subsea hydraulic actuator assembly in accord with the present invention.

FIG. 2 shows actuator 10 in a somewhat enlarged view. Actuator housing 22 is removably connected to bonnet 24 preferably be means of bolts 26 although other removable fasteners, such as various types of bolts or clamps could also be used.

The present invention preferably uses enlarged hydraulic ports, such as ports 28 and 29, which may be a ⅜ inch port useable with a customer requested connector size to thereby provide greater flow of hydraulic fluid and hence, faster operation of the actuator. Additional ports or sizes of hydraulic ports could be used as desired. An accumulator, such as pressure balanced accumulator 30, may be used to provide a hydraulic assist that is used in subsea systems for pressure balance and to thereby assist return spring 32 for moving piston 34. It will be noted that at least three forces may act to move piston 34 including forces from return spring 32, hydraulic force from pressure balanced accumulator 30, and line pressure acting on gate valve components. Piston 34 moves upwardly and downwardly between a first position and a second position for operating gate valve 12. Depending on the construction of the gate valve, the upward position could be either an open or closed position of the valve. Usually, a failsafe valve is either a normally open valve or a normally closed valve, depending on the requirement, such that if failure occurs then the valve returns to the desired position. In general, it will be understood that such terms as "up," "down," "vertical," and the like, are made with reference to the drawings and/or the earth and that the devices may not be arranged in such positions at all times depending on variations in operation, transportation, mounting, and the like. As well, the drawings are intended to describe the concepts of the invention so that the presently preferred embodiments of the invention will be plainly disclosed to one of skill in the art but are not intended to be manufacturing level drawings or renditions of final products and may include simplified conceptual views as desired for easier and quicker understanding or explanation of the invention. The relative size and shape of the components may be greatly different from that shown and the invention still operate in accord with the novel principals taught herein.

Figure 3:
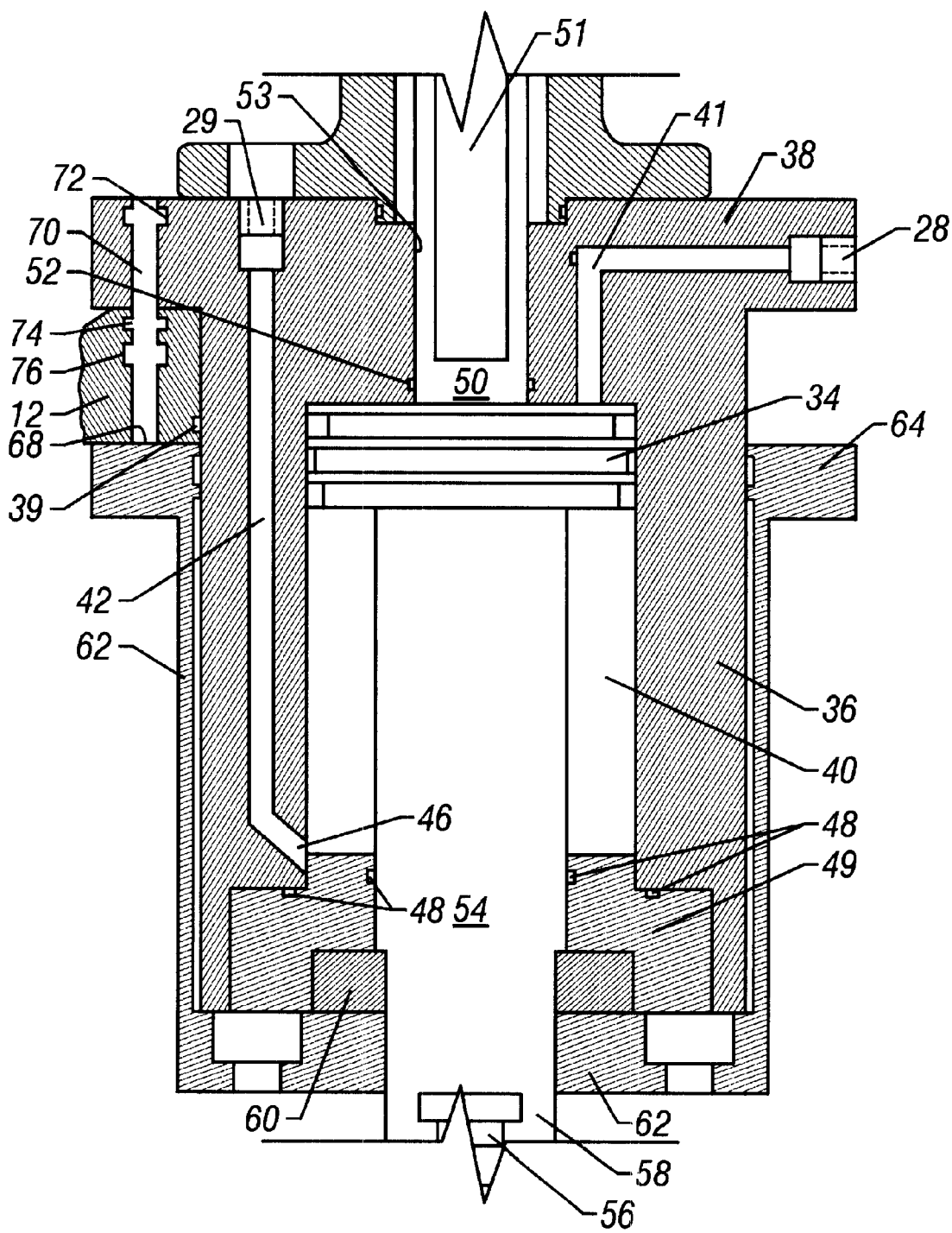
FIG. 3 is an enlarged elevational view, partially in section, of a hydraulic cylinder configuration in accord with the present invention.

As more clearly shown in FIG. 3, hydraulic cylinder housing 36 includes and may be monolithically formed along with upper flange portion 38. Hydraulic cylinder housing 36 defines hydraulic cylinder 40 therein in which piston 34 reciprocates. Upper flange portion 38 is securely supported by actuator housing 12. Appropriate seals such as seal 39 are provided therebetween. Hydraulic control port 28 and hydraulic assist port 29 are conveniently drilled into upper flange portion 38. Hydraulic control passageway 41 goes to the upper end of hydraulic cylinder 40. Hydraulic assist passageway 42 extends along a substantial length of hydraulic cylinder housing 36 and is ported into hydraulic cylinder 40 at the bottom of potential travel of piston 34 as indicated at 46. Thus, hydraulic control port 28 and hydraulic control passageway 41 provide the connection to an external hydraulic control line (not shown) used to operate, either open or close, the gate valve. Fail-safe actuator 10 may either automatically close or open valve 12 upon failure of the hydraulic system, depending on the valve design. A typical operating pressure of subsea control systems is in the range of about 3000 p.s.i. working pressure above the hydrostatic head pressure.

Hydraulic cylinder 40 is sealed to contain hydraulic fluid therein at lower seals such as lower seals 48 between cylinder housing 36, actuator stem 54, and lower cylinder head 49. Lower cylinder head 49 is secured to cylinder housing 36. Actuator stem 54 is moveable with respect to cylinder housing 36 and lower cylinder head 49. Hydraulic cylinder 40 is also sealed using upper seals around manual override slave member 50 such as those seals indicated at 52. Override slave member 50 is threadably connected to manual rotary shaft 51. Therefore, override slave member 50 reciprocates when manual rotary shaft 51 is rotated as discussed in more detail subsequently. Override slave member 50 extends through opening 53 in the upper portion of cylinder housing 36 to thereby enter hydraulic cylinder 40 and engage piston 34. As override slave member 50 moves downwardly, hydraulic piston 34 is also moved downwardly to thereby operate valve 12 manually. If a manual override is not desired, then opening 53 is not made in cylinder housing 36 or a plug can be installed.

In a presently preferred embodiment, no cylinder 40 seals are required for sealing around a piston position indicator, as discussed hereinafter. Thus, the piston position indicator does not require seals that act against the hydraulic fluid.

Moreover, since hydraulic cylinder 40 contains all hydraulic fluid therein, return spring 32 is completely isolated from hydraulic fluid. One of the problems of prior art actuators is that hydraulic fluid, which is sometimes contaminated, contacts the return spring and gradually damages it. The present invention provides that no hydraulic fluid is external to hydraulic cylinder 40 within actuator 10 except, of course, for passageways 41 and 42. This feature also limits the total amount of hydraulic fluid used by actuator 10 so that maintenance operations to clean hydraulic fluid are less time consuming with respect to actuator 10. The large diameter passageways 41 and 42 (preferably three-quarter inches) allow faster flow of the small amount of hydraulic fluid needed to operate actuator 10 to thereby provide fast operation.

Actuator piston stem 54 is driven by piston 34 to reciprocate and thereby to open and close valve 12. For this purpose, actuator piston stem 34 is attached to piston 34 (See FIG. 1 and FIG. 2). Removably attached to stem 54 is stem extension 56. Stem extension 56 is preferably connected to stem 54 by a first t-slot connection 58. In a presently preferred embodiment, t-slot connections are used to provide an easily connectable/disconnectable connection for quick assembly and disassembly of actuator 10 and readily accessible removal/assembly to valve 12. Moreover, t-slot connections are highly tolerant of slight misalignments that may occur when connecting to a wide variety of different types of valves while still providing a highly reliable connection. A second t-slot connection may also be used in accord with the present invention for connecting to the valve stem as discussed subsequently for even greater flexibility in assembly/disassembly.

Referring again to FIG. 3, drive nut 60 is fastened to stem 54 by any suitable means, such as a threaded connection. When piston 34 is moved downwardly, drive nut 60 engages spring pusher 62 which also moves downward. Flange 64 then compresses return spring 32 as flange 64 is moved downwardly. Spring pusher 62 is in surrounding relationship to hydraulic cylinder housing 36 and preferably reciprocates telescopingly with respect thereto.

In one embodiment of the present invention, piston indicator 66 (See FIG. 2) engages or mounts with respect to upper surface 68 by any suitable means and extends through passageway 70 (See FIG. 3). Thus, as mentioned previously piston indicator 66 indicates the position of piston 34 without the need to connect into hydraulic cylinder 40. The present design therefore conveniently avoids the attendant requirement of more complicated seals in hydraulic cylinder 40 and/or problems if leakage through such seals did occur. Instead, a relatively less complex seal assemblies can be used for sealing piston position indicator 62 such as seals positioned at 72, 74, and 76 with no possibility of leakage into the hydraulic cylinder. Referring back to FIG. 2, it will be seen that piston position indicator 66 is protected from damage by cage 78. Cage 78 has open spaces that, in one embodiment, permit easy viewing of piston position indicator 66 for a total span of approximately 270 degrees around subsea actuator 10. For instance, an ROV (remotely operated underwater vehicle) or possibly a diver, diving bell, or submarine may be utilized to visually check the status of piston position indicator. Additionally, piston position indicator 66 may be used to drive electrical contacts and/or other means for convenient piston position indication.

Figure 4:
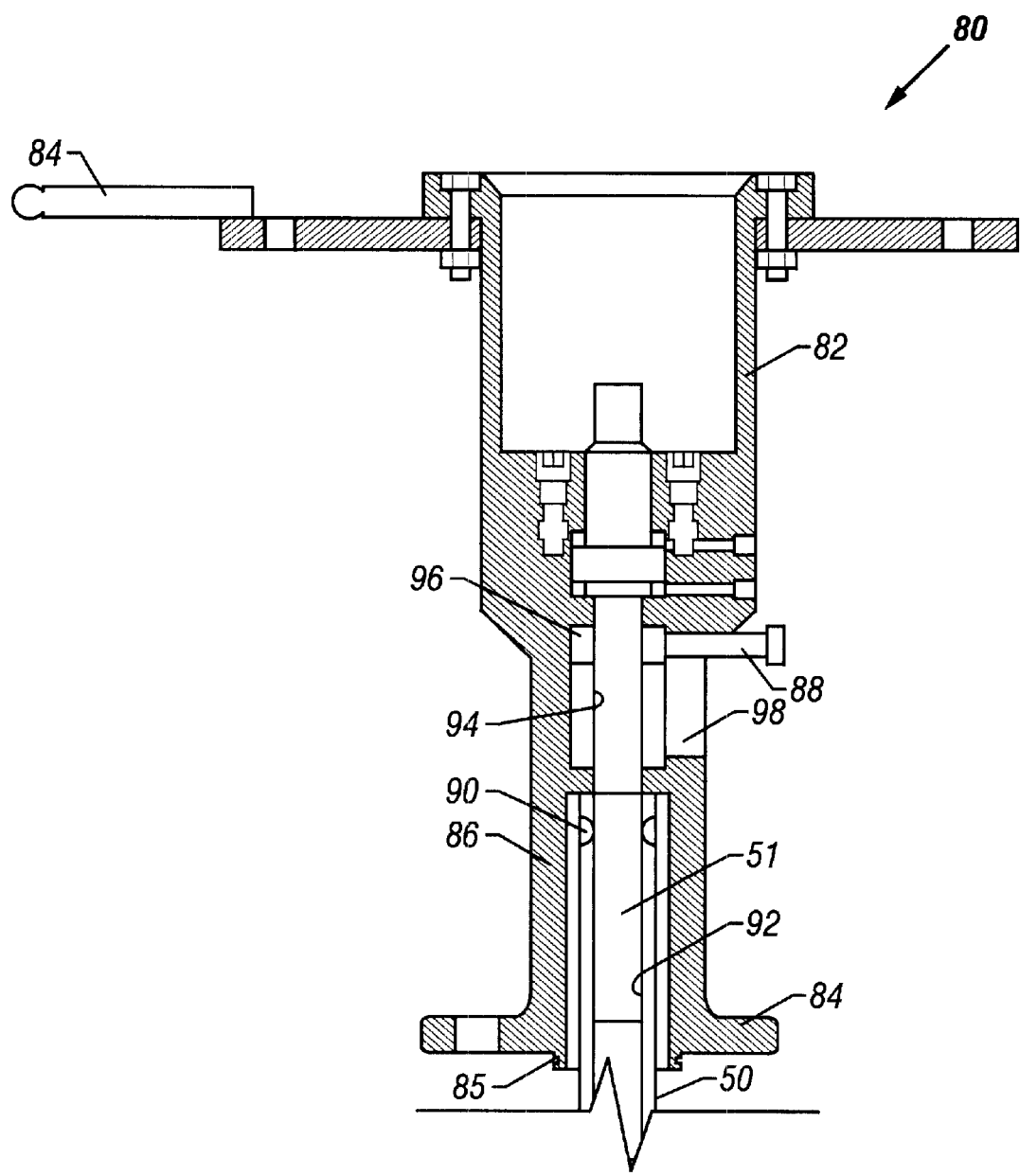
FIG. 4 is an enlarged elevational view, partially in section, of a manual override in accord with the present invention.

FIG. 4 discloses manual overdrive assembly 80 in some detail. Manual override housing 86 may be secured to hydraulic cylinder housing 36 by bolts or other suitable fasteners through flange 84. Seals 85 conveniently seal with hydraulic cylinder housing 36. ROV adaptor 82 can be engaged by an ROV for rotation thereof to activate manual override assembly 80. Alternatively, arms 84 or other suitable means can be used by a diver for manual operation. One of the problems of using a manual override is the extra space that is required. In a presently preferred embodiment of the present invention, the overall length of actuator 10 even including manual override position indicator 88 is kept considerably smaller than the overall length of comparable operating capacity prior art actuators. Thus, the present invention provides numerous beneficial features in a more compact package. As adaptor 82 is rotated, manual override shaft 51 also rotates. As discussed previously, when override shaft 51 rotates, then slave member 50 reciprocates because slave member 50 is threadably connected to override shaft 51. Override slave member 50 is prevented from rotation by some means such as guide members 90 that may engage respective slots in override slave member 50. By use of a slave member that only reciprocates but does not rotate, sealing of slave member 50 with respect to hydraulic cylinder 40 is more reliable. In order to reduce the overall length of manual indicator assembly 80, override position indicator 88 preferably has a travel length less than the travel length of override slave member 50. For instance, there may be a 2:1 ratio such that if override slave member 50 moves six inches, then override position indicator 88 may move only three inches. This feature reduces the overall length of subsea actuator 10. In the present invention, the ratio is accomplished by using different thread pitches. For instance, threads 92 of the threaded connection between manual override shaft 51 and manual override slave member 50 have a different thread pitch than threads 94 of the threaded connection between manual override shaft 51 and override indicator carrier portion 96. As override shaft 51 rotates, override indicator 88 reciprocates within slot 98 where it is prevented from rotation. Thus, by reducing the length of travel of override position indicator 88, the overall length of manual override assembly 80 is accordingly reduced. Other mechanical gear reduction means could also be used with the effect of a shorter travel length for the position indicator in accord with the concept of the present invention.

Figure 5:
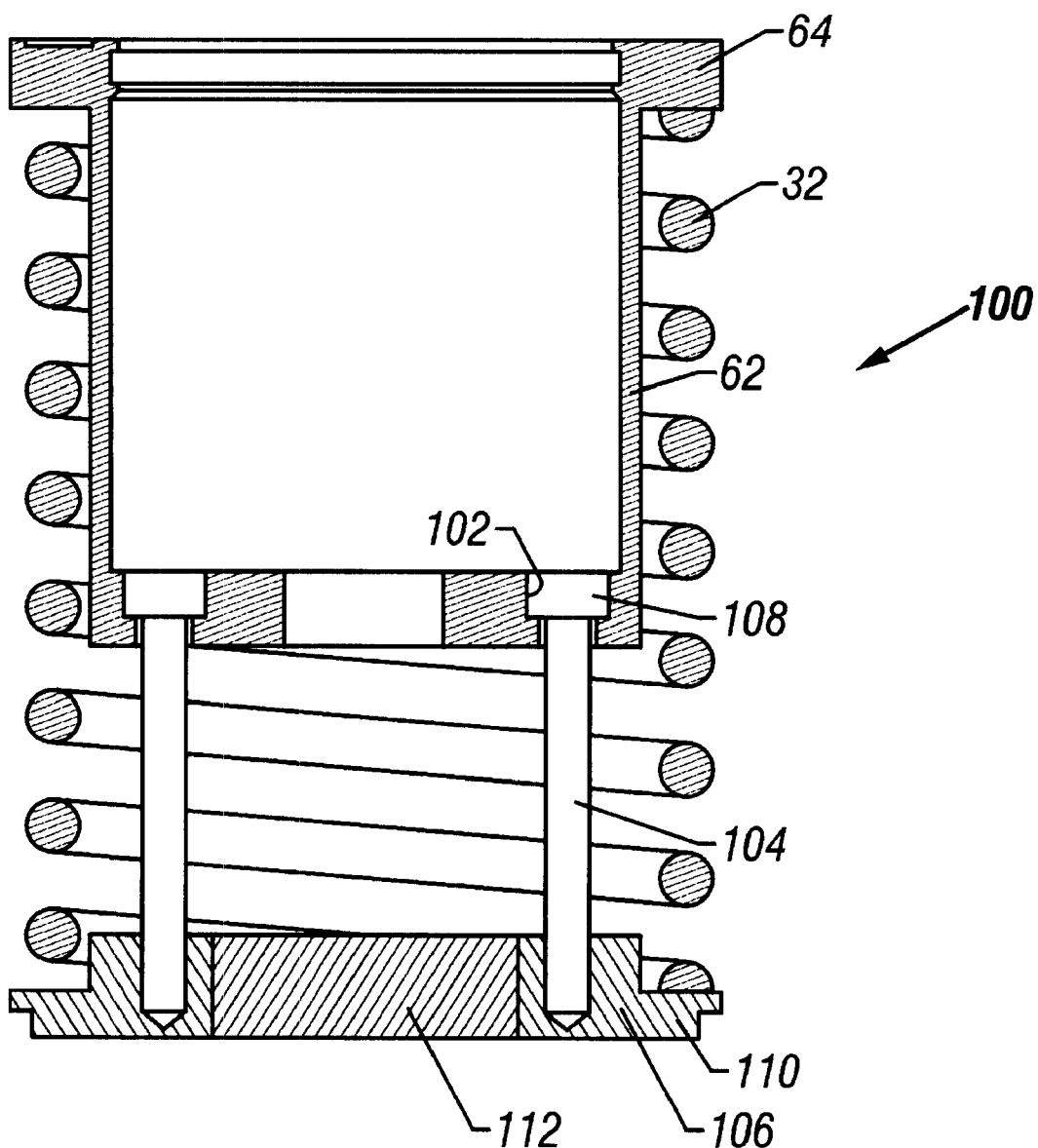
FIG. 5 is an enlarged elevational view, partially in section, of a spring cartridge assembly in accord with the present invention.

FIG. 5 shows an enlarged view of a preferred embodiment of spring cartridge assembly 100 in accord with the present invention. Spring cartridge assembly 100 may be replaced as a unit without the need for compressing spring 32 in the field. This considerably speeds and simplifies maintenance procedures and avoids safety problems related to high tension springs. Moreover, this construction greatly improves the safety of working with subsea actuators which typically have very power return springs. Bolt holes 102 are formed in spring pusher 62 to permit use of pre-loading bolts 104 to compress spring 32 to thereby pre-load the tension on spring 32 to a desired tension setting. In this way, a compact spring cartridge assembly 100 can be utilized to overcome the significant hydrostatic forces due to operation at significant water depths while reducing the overall length of subsea actuator 10. Pre-loading bolts 104 may be conveniently threadably connected to bottom mounting plate 106. Spring 32 is completely contained between upper flange 64, whose upper movement is limited by bolt head 108, and lower flange 110 whose downward movement is also limited by bolt head 108. Therefore, rotation of bolt head 108 can be used for pre-loading the tension on spring 32 to achieve the many advantages discussed hereinbefore. For instance, one significant safety advantage of the present invention is that spring 32, which is under very high stress and is quite dangerous to remove, never has to be even considered or seen in servicing from the top or bottom of subsea actuator 10. Spring cartridge assembly 100 is positioned within actuator housing 22 as shown in FIG. 1 and FIG. 2. It will be noted that in the present design, actuator housing 22 can be easily expanded radially outwardly to accommodate an even larger spring, if desired, without the need to make any change in the volume of hydraulic cylinder chamber 40. Thus, the present invention design is extremely flexible without requiring hydraulic control fluid volume changes. Hydraulic control systems operating volume may be quite limited in subsea applications because they often require an accumulator and/or hydrostatically pressurized fluid reservoir with limited hydraulic volume flow output. In one embodiment of the invention, stroke adjustment nut 112 may be used to set the stroke length and/or drift adjustment of subsea actuator 10, if this feature is desired for any particular application. Otherwise, adjustment nut 112 may be removed from the actuator housing as desired.

Figure 6:
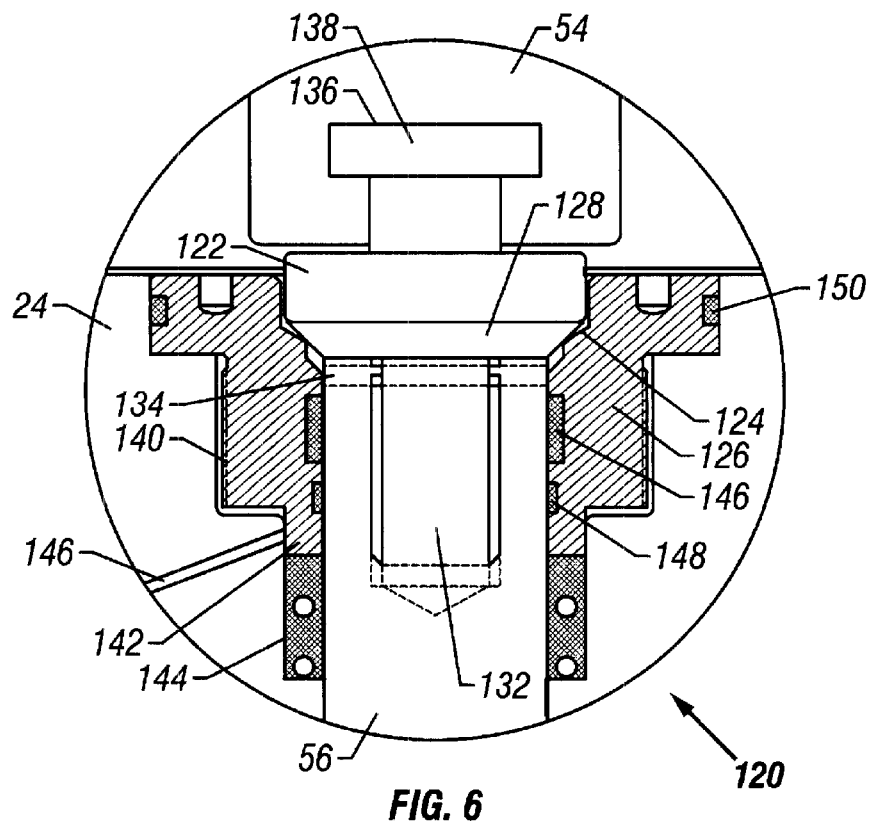
FIG. 6 is an enlarged elevational view, partially in section, of a back seat valve and seat in accord with the present invention.

In FIG. 6, upper back seat/gland assembly 120 is disclosed in an enlarged view wherein upper back seat valve 122 is engaged with seat 124 of packing gland 126. Upper back seat valve 122 has sealing surface 128 that engages seat 124 for providing a seal, which preferably may be a metal-to-metal seal around stem extension 56. Other types of back seat valve seals could also be used, if desired, although metal-to-metal seals have the advantage of being insensitive to temperature, fluids sealed, and the like. Therefore, even if very slow leakage could possibly occur through a packing, the metal-to-metal seal of upper back seat valve 122 or the lower back seat valve 130 discussed subsequently prevents communication between gate valve chamber 20 and actuator housing 22. In FIG. 2, upper back seat valve 122 is shown in an upper unengaged position when lower back seat valve 130 is in the engaged position as discussed subsequently in connection with FIG. 7. Thus, in accord with this embodiment of the invention, at least one of the two back seat valves is always engaged for sealing around stem extension 56. In a presently preferred embodiment, upper back seat valve 122 (and also lower back valve 130) is threadably attached to stem extension 56 such as by threaded connection 132. To prevent threaded connection from backing out, a stop member such as pin 134 may be provided. If upper back seat valve 122 wears, then the less expensive upper back seat valve 122 can be easily replaced without the need to replace the entire stem extension 56 thereby reducing maintenance costs. Upper back seat valve 122 is preferably connected to piston stem 54 by means of a t-slot connection for advantageous reasons discussed hereinbefore. As shown in the enlarged detail, t-slot connection includes a t-shaped slot 136 and a t-shaped member 138 disposed therein.

Packing gland 126 supports additional packings and primary seals to seal around stem extension 56. Packing gland may be threadably attached to bonnet 24 by means of threads 140. End member 142 then engages extension stem packing 144 for compression activation thereof. Additional stem seal/support members 146 and 148 may also be utilized. Packing gland 126 is also sealed with respect to bonnet 24 by means of seals such as seal 150. If wear should occur, packing gland 126 can be inexpensively replaced rather than replacing bonnet 24. If leakage should occur past packing 144, then the present invention provides check valve 146 between packing 144 and packing gland seal 24. Check valve 146 is a one-way valve that will open if the internal pressure at check valve 146 is greater than hydrostatic pressure external to the actuator thereby relieving pressure before the pressure becomes great enough to leak past static seal 150 or seal 148. Referring to FIG. 2, test port 152 can be used to test for leakage into bonnet 24. Thus, it can be verified whether any leakage occurs. If desired test port 152 can be sealed after checking for leakage or a pressure sensor could be attached to permit remote monitoring.

Figure 7:
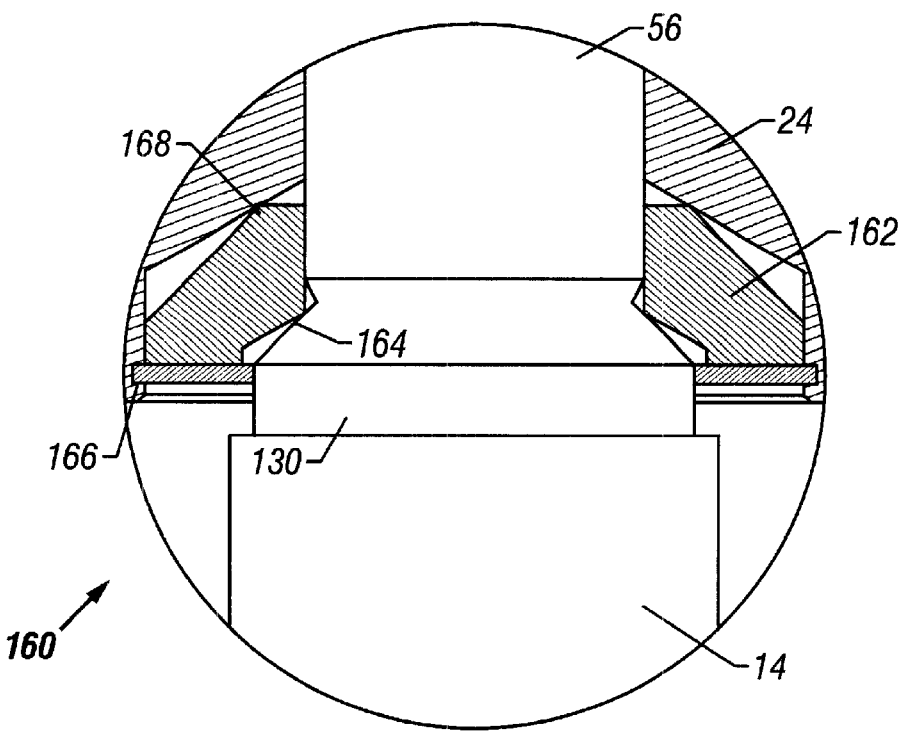
FIG. 7 is an enlarged elevational view, partially in section, of a second back seat valve with a replaceable seat in accord with the present invention.

FIG. 7 shows lower backseat seal assembly 160 with lower backseat valve 130 engaged with lower replaceable seat member 162 along lower backseat valve sealing surface 164. Replaceable seat member 162 is preferably a softer metal so that wear occurs within replaceable seat member 162. Retainer 166 is utilized to retain replaceable seat member 162 in position. Replaceable seat member 162 also seals with bonnet 22 at seal surface 168. Replaceable seat member 162 is also softer metal than bonnet 22 so that the lower cost replaceable seat member 162 can be replaced in the event of leakage and/or for maintenance purposes. Preferably metal-to-metal seals are made with the back seat valves due to the advantage of high temperature operation and reliable sealing. The back seat valves 122 and 130 can also perform the function of providing an upper and lower stop for travel of gate 14 and, if desired, take over the function of travel stop member 112. If desired, the relative position of back seat valves 122 and 130 may be adjustable along the actuator shaft to provide for fine tuning of travel opening and closing positions.

In operation, hydraulic fluid enters control port 28 to pressurize hydraulic piston 36 to move downwardly. It will be noted again that directions are used only for convenience of understanding with respect to the figures and that the actuators may be oriented in various ways which will not affect reliable operation of the present invention so that such directions as used are not intended to be limiting in any way. As hydraulic piston 34 moves downward, it also moves the driving stem assembly, which may include one or more elements such as actuator stem 54 and extension stem 56, to thereby move valve gate 14. This motion also moves spring pusher 62 downwardly to compress spring 32 by means of spring pusher flange or lip 64. Hydraulic fluid is exhausted from cylinder 40 through assist line port 29 into accumulator 30. Upper back seat valve 122 and lower back seat valve 130 seal off any passageway between the valve housing and actuator housing such that leakage therebetween is prevented, preferably by metal-to-metal seals. In one preferred embodiment, the stroke may be stopped when upper back seat valve 122 engages packing gland 126.

To close gate valve 12, hydraulic pressure is released from port 28. High tension spring 32 assisted by pressure from accumulator 30 (or other accumulator) acts to quickly close the valve by pressing upwardly against lip 64 in concert with hydraulic assist pressure acting on piston 34 to thereby move the stem assembly and hydraulic piston 34 upwardly to activate the gate valve to its fail-safe position. Because all hydraulically controlled elements are sealed both upwardly and downwardly for both control pressure and assist pressure operation, the design of the present invention can operate with confidence even at zero valve body cavity pressure. While the present invention preferably provides a subsea actuator, the same principles of operation could be used in other actuators such as surface actuotors. It will also be understood that depending on the water depth, suitable modifications may be made, e.g., a different relief valve may be used in the valve bonnet.

The foregoing disclosure and description of the invention is illustrative and explanatory thereof, and it will be appreciated by those skilled in the art, that various changes in the size, shape and materials as well as in the details of the illustrated construction or combinations of features of the various coring elements may be made without departing from the spirit of the invention.

What is claimed is:

1. A method for preventing leakage between an actuator and a gate valve wherein an actuator shaft is reciprocally moveable for operating said gate valve, said method comprising:

mounting a first actuator shaft valve member in surrounding relationship to said actuator shaft for movement therewith;

providing a first scat in surrounding relationship to said actuator stem; and engaging said first actuator shaft valve member with said first scat when said actuator shafts moves to a first position so as to prevent leakage around said actuator shaft between said actuator and said gate valve, and disengaging when said actuator shaft moves to a second position;

mounting a second actuator shaft valve member to said actuator shaft for movement therewith, said second actuator shaft valve member being axially spaced from said first actuator shaft valve member along said actuator shaft;

providing a second scat in surrounding relationship to said actuator stem; and engaging said second actuator shall valve member with said second seat when said actuator shafts moves to said second position so as to prevent leakage around said actuator shaft between said actuator and said gate valve, and disengaging when said actuator shaft moves to said first position.

2. The method of claim 1, further comprising:

replaceably mounting said first actuator shaft valve member to said actuator shaft.

3. The method of claim 1, further comprising:

providing a replaceable bushing as said first seat.

4. The method of claim 1, further comprising:

mounting said first seat and said first actuator shaft valve member in an actuator housing which is sealed from a valve housing.

5. The method of claim 1, further comprising:

mounting said second seat and said second actuator shaft valve member in a valve housing which is sealed from an actuator housing.

6. A method for preventing leakage between an actuator and a gate valve wherein an actuator shaft is reciprocally moveable for operating said gate valve, said method comprising:

removably affixing a first actuator shaft valve member to said actuator shaft for movement with said actuator shaft, said first actuator shaft valve member extending radially outwardly from said actuator shaft assembly and being in surrounding relationship to said actuator shall assembly; and providing a seat in at least one of a valve housing or an actuator housing in surrounding relationship with said actuator shaft and being fixed in position with said valve housing and said actuator housing such that said first actuator shaft valve member engages said seat when said actuator shaft moves to a first position to provide an additional seal between said actuator housing and said valve housing and disengages when said actuator shaft moves to a second position.

7. A method for assembly a valve actuator for a valve, said method comprising:

providing a hydraulic actuator housing attachable to said valve;

providing a return spring for placement within said hydraulic actuator housing;

engaging one end of said return spring with a first lip member;

engaging an opposite end of said return spring with a second lip member;

securing said first lip member and said second lip member together to thereby compress said return spring:

selectively adjusting tension on said return spring by adjusting a maximum length between said first lip and second lip; and installing said first lip member, said second lip member, and said return spring simultaneously into said hydraulic housing as a unit.

8. A method of claim 7, further comprising:
installing a hydraulic piston in said actuator housing without decompressing said return spring.

9. The method of claim 7, further comprising:
providing a plurality of seals to thereby prevent contact of hydraulic fluid with said return spring.

10. The method of claim 7, further comprising:
providing an actuator stem assembly attached to said hydraulic piston, and
attaching one or more back seat valves to said actuator stem for engaging one or more respective seats to seal around said actuator stem.

11. The method of claim 7, further comprising:
connecting a piston position indicator to said first lip.

12. A valve actuator for a valve, said actuator comprising:
a hydraulic actuator housing attachable to said valve;
a hydraulic piston slidably mountable within said hydraulic housing responsively to hydraulic pressure, said hydraulic piston being moveable to a first position for closing said valve and to a second position for opening said valve;
a cylinder member defining therein a piston chamber, said hydraulic piston being mounted for movement within said piston chamber, said cylinder member defining a first hydraulic fluid port into said piston chamber on a first side of said piston and a second hydraulic fluid port into said piston chamber on a second side of said piston;
a plurality of seals for limiting movement of hydraulic fluid within said hydraulic actuator housing to said piston chamber and said first hydraulic fluid port and said second hydraulic fluid port;
a manual override assembly for manually operating said hydraulic piston; and
a return spring chamber within said hydraulic actuator housing, said return spring chamber being fluidly isolated from said piston chamber; and
a return spring within said return spring chamber such that said return spring is isolated from said hydraulic fluid.

13. The valve actuator of claim 12, further comprising:
an accumulator connected to at least one of said first hydraulic fluid port or said second hydraulic fluid port to provide hydraulic assist to said return spring for moving said hydraulic piston to at least one of said first position or second position.

14. The valve actuator of claim 12, further comprising:
said first hydraulic port and said second hydraulic port having an inner diameter at least three-quarter inches.

15. The valve actuator of claim 12, further comprising:
an actuator shaft attached to said hydraulic piston;
a spring pusher attached to said hydraulic shaft, said spring pusher having a lip section; and
a base section secured to said actuator housing, said return spring being mounted between said base and said lip section of said spring pusher.

16. The valve actuator of claim 15, wherein:
said return spring is preloaded for a desired tension when mounted between said base and said lip section.

17. The valve actuator of claim 16, wherein:
said base is secured to said actuator housing such that said actuator housing is removable from said valve without decompressing said preloaded return spring.

18. The valve actuator of claim 16, wherein:
said cylinder member is removable from said actuator housing without decompressing said preloaded return spring.

19. A valve actuator for use with a valve, said valve having a valve body with a valve body cavity therein, a valve body cavity seal for sealing said valve body cavity, said actuator comprising:
a hydraulic actuator housing attachable to said valve;
a hydraulic piston slidably mountable within said hydraulic actuator housing responsively to hydraulic pressure;
an actuator shaft assembly connected with respect to said hydraulic piston and extending into said valve body cavity for operating said valve such that said hydraulic piston is moveable to a first position for closing said valve and to a second position for opening said valve; and
a first actuator shaft valve member mounted in surrounding relationship to said actuator shaft and extending radially outwardly from said actuator shaft, said first valve member being affixed to said actuator shaft for movement with said actuator shaft; and
a first seat assembly in surrounding relationship to said actuator shaft and affixed in position with respect to said actuator housing and said valve body, said first actuator shaft valve member being engageable said first seat assembly for sealing around said actuator shaft to provide an additional seal between said hydraulic actuator housing and said valve body when said hydraulic piston is moved to at least one of said first position or said second position, said first actuator shaft valve member being moveable axially away from said first seat assembly so as not to seal with said first seat assembly when said hydraulic piston is moved to the other of said first position or second position, said first seat assembly comprising a replaceable seat removeable from said actuator housing and said valve body.

20. The valve actuator of claim 19, further comprising:
a packing body member in surrounding relationship to said actuator shaft;
a packing body seal in surrounding relationship to said packing body member;
a packing gland adjacent said packing member, said packing gland being threadably securable to and threadably removeable from said actuator housing, said packing gland comprising said replaceable seat removeable from said actuator housing and said valve housing.

21. The valve actuator of claim 19, further comprising:
said first actuator shaft valve member being threadably securable to said actuator shaft and threadably removeable from said actuator shaft.

22. The valve actuator of claim 19, further comprising:
a second actuator shaft valve member mounted in surrounding relationship to said actuator shaft and extending radially outwardly from said actuator shaft, said second actuator shaft valve member being axially spaced along said actuator shaft from said first actuator shaft valve member, said second actuator shaft valve member being affixed to said actuator shaft for movement with said actuator shaft, and
a second seat assembly in surrounding relationship to said actuator shaft and affixed with respect to said hydraulic housing and said valve body, said second actuator shaft valve member engaging said second seat assembly being operable for sealing around said actuator shaft when said hydraulic piston said to at least one of said first position or said second position, said second seat moving axially away from said second seat assembly so as not to seal with said second seat assembly when said hydraulic piston is moved to the other of said first position or second position.

23. A valve actuator for use with a valve, said valve having a valve body with a valve body cavity therein, a valve body cavity seal for sealing said valve body cavity, said actuator comprising:

a hydraulic actuator housing attachable to said valve;

a hydraulic piston slidably mountable within said hydraulic actuator housing responsively to hydraulic pressure:

seals for isolating said hydraulic actuator housing from said valve body cavity;

an actuator shaft assembly connected with respect to said hydraulic piston and extending from said hydraulic actuator housing through said seals into said valve body cavity for operating said valve such that said hydraulic piston is moveable to a first position for closing said valve and to a second position for opening said valve; and a first actuator shaft valve member mounted to said actuator shaft assembly for movement with said actuator shaft, said first actuator shaft valve member extending radially outwardly from said actuator shaft assembly and being in surrounding relationship to said actuator shaft assembly, said first actuator shaft valve member being mounted to a portion of hydraulic shaft assembly which is always positioned within said hydraulic actuator housing during operation of said valve actuator; and a first seat in surrounding relationship to said actuator shaft assembly and being affixedly mounted within said hydraulic actuator housing, said first actuator shaft valve member engaging said first seat for sealing engagement around said actuator shaft assembly when said hydraulic piston is moved to at least one of said first position or said second position to thereby provide an additional seal between said hydraulic actuator housing and said valve body cavity, said first actuator shaft valve member moving axially away from said first seat so as not to seal with said first seat when said hydraulic piston is moved to the other of said first position or second position.

24. The valve actuator of claim 23, wherein said first actuator shaft valve member seals with said first seat when said hydraulic piston is in said first position.

25. The valve actuator of claim 23, further comprising:

a second actuator shaft valve member in surrounding relationship to said actuator shaft assembly, and a second seat in surrounding relationship to said actuator shaft assembly said second actuator shaft valve member engaging said second seat for sealing around said shaft, said second actuator shaft valve member and said second seat being positioned outside of said valve actuator housing and in fluid communication with said valve body cavity.

26. The valve actuator of claim 25, wherein said second actuator shaft valve member seals with said second seat when said hydraulic piston is in said second position.

27. The valve actuator of claim 23, further comprising:

a first threadably replaceable bushing for said first seat, said first threadably replaceable bushing providing said sealing engagement with said first actuator shaft valve member.

28. The valve actuator of claim 23, wherein said first valve actuator shaft member is replaceably mounted to said actuator shaft.

29. A valve actuator for a valve, said actuator comprising:

a hydraulic actuator housing attachable to said valve;

a hydraulic piston slidably mountable within said hydraulic housing responsively to hydraulic fluid, said hydraulic piston being moveable to a first position for closing said valve and to a second position for opening said valve;

a return spring in a coiled configuration within said hydraulic actuator housing;

a moveable member within said hydraulic actuator housing with a surface for engaging one end of said return spring;

a bottom mounting plate with a lip for engaging an opposite end of said return spring;

one or more pro-load bolts, said pre-load bolts being secured to said moveable member and said bottom mounting plate to thereby limit expansion of said return spring for pre-loading said return spring with tension, said return spring and said moveable member and said bottom mounting plate and said one or more pro-load bolts forming unit which may be inserted into or removed from said hydraulic actuator housing.

30. The valve actuator of claim 29, wherein said one or more pre-load bolts are adjustable to thereby permit a selective pre-load of tension to be placed on said return spring.

31. The valve actuator of claim 29, further comprising:

a hydraulic cylinder housing mounted in said actuator housing and defining a hydraulic cylinder therein in which said hydraulic piston is slidably mounted, said moveable member being in surrounding relationship to said hydraulic cylinder housing.

32. The valve actuator of claim 29, further comprising:

a plurality of seals to thereby prevent contact of said hydraulic fluid with said return spring.

33. The valve actuator of claim 29, further comprising:

an actuator stem attached to said hydraulic piston, and one or more back seat valves attached to said actuator stem for engaging one or more respective seats to seal around said actuator stem.

34. The valve actuator of claim 29, wherein:

said bottom mounting plate and said spring pusher and said return spring is removable from said hydraulic actuator housing without decompressing said return spring.

35. The valve actuator of claim 29, wherein:

said hydraulic piston is removable from said hydraulic actuator housing without decompressing said return spring.

* * * * *

UNITED STATES PATENT AND TRADEMARK OFFICE
CERTIFICATE OF CORRECTION

PATENT NO. : 6,684,897 B2
DATED : February 3, 2004
INVENTOR(S) : Alagarsamy Sundararajan It is certified that error appears in the above-identified patent and that said Letters Patent is hereby corrected as shown below:

<u>Column 2,</u>
Lines 5-6, delete "dissasembling" and replace with -- disassembling --.

<u>Column 3,</u>
Line 26, delete "sidably" and replace with -- slidably --.
Line 59, delete "Morever" and replace with -- Moreover --.

<u>Column 11,</u>
Line 46, delete "actuotors" and replace with -- actuators --.
Line 66, delete "scat" and replace with -- seat --.
Line 67, delete "stem" and replace with -- shaft --.

<u>Column 12,</u>
Lines 2 and 12, delete "scat" and replace with -- seat --.
Line 13, delete "stem" and replace with -- shaft --.
Lines 14 and 42, delete "shall" and replace with -- shaft --.
Line 15, delete "shafts" and replace with -- shaft --.
Lines 40 and 42, delete "assembly".
Line 53, insert -- of -- between "assembly" and "a".

<u>Column 13,</u>
Line 52, insert -- of -- between "diameter" and "at".

<u>Column 14,</u>
Line 7, delete "scaling" and replace with -- sealing --.
Line 13, delete "assembly".

<u>Column 15,</u>
Line 2, delete the first "said" and replace with -- is moved --.
Line 30, delete "hydraulic" and replace with -- actuator --.
Line 30, insert -- said -- between "of" and the newly inserted word "actuator".

UNITED STATES PATENT AND TRADEMARK OFFICE
CERTIFICATE OF CORRECTION

PATENT NO.   : 6,684,897 B2
DATED        : February 3, 2004
INVENTOR(S)  : Alagarsamy Sundararajan It is certified that error appears in the above-identified patent and that said Letters Patent is hereby corrected as shown below:

<u>Column 16,</u>
Line 9, insert -- valve -- between "said" and "actuator".
Lines 25 and 30, delete "pro-load" and replace with -- pre-load --.
Line 31, insert -- a -- between "forming" and "unit".

Signed and Sealed this

Fourth Day of May, 2004

JON W. DUDAS
*Acting Director of the United States Patent and Trademark Office*